United States Patent [19]
Walker et al.

[11] 3,897,505
[45] July 29, 1975

[54] 1,1,3,4,4,4-HEXACHLORO-1,2-BUTADIENE AND ITS DIMER

[75] Inventors: David G. Walker, Baytown; Norman L. Ruland, Conroe, both of Tex.

[73] Assignee: Tenneco Chemicals, Inc., Saddle Brook, N.J.

[22] Filed: Jan. 22, 1973

[21] Appl. No.: 325,823

[52] U.S. Cl............ 260/648 R; 260/654 R; 260/655
[51] Int. Cl...................... C07c 17/06; C07c 21/20
[58] Field of Search......................... 260/648 R, 655

[56] References Cited
UNITED STATES PATENTS
2,675,413   4/1954   Ballard et al..................... 260/648 R
FOREIGN PATENTS OR APPLICATIONS
1,000,797   1/1957   Germany......................... 260/648 R

OTHER PUBLICATIONS

Chem. Abs., 6th Collective Index, p. 2094, (1957–1961); Keller et al.

Chem. Abs., Vol. 54, p. 1294c, (1960).

Straus et al., Ber., 63, 1886–1899 (1930).

Primary Examiner—Howard T. Mars
Assistant Examiner—Nicky Chan
Attorney, Agent, or Firm—Evelyn Berlow

[57] ABSTRACT

Dichlorodiacetylene is chlorinated in an inert solvent to form a product that comprises 1,1,3,4,4,4-hexachloro-1,2-butadiene. The hexachloro-1,2-butadiene dimerizes readily to a substituted cyclobutane that is useful as a flame retardant for resinous materials.

19 Claims, No Drawings

1,1,3,4,4,4-HEXACHLORO-1,2-BUTADIENE AND ITS DIMER

This invention relates to 1,1,3,4,4,4-hexachloro-1,2-butadiene and its dimer. It also relates to a process for the production of these compounds.

Polyhalogenated paraffinic and olefinic hydrocarbons have combinations of properties that make them valuable in a number of industrial applications. Some of these compounds are high density oils that are useful as flame-retardant hydraulic fluids and as ore flotation liquids, while others find their major use as flame-retardant plasticizers for resinous materials.

In the past these polyhalogenated compounds have been manufactured by processes in which bromine or chlorine atoms are substituted for hydrogen atoms in the appropriate hydrocarbon. It has been recognized that the direct halogenation of acetylenic compounds is a much less expensive route to these compounds, but it has been difficult to carry out these addition reactions because diacetylene, vinylacetylene, methylacetylene and other acetylenic compounds are difficult to handle and to store since they tend to detonate on compression.

Straus et al. reported (Ber. 63B, 1886–99 (1930)) that when diacetylene is introduced into an aqueous hypohalite solution the corresponding dihalodiacetylene is formed and that when the unstable dihalodiacetylenes are further halogenated the halogen adds symmetrically to form hexahalo-1,3-butadienes. They taught that homogeneous polyhalogenated products are obtained only when the entering halogen is the same as that already in the dihalodiacetylene; that is, the bromination of dibromodiacetylene yields a single hexabromo-1,3-butadiene, whereas the reaction of dibromodiacetylene with iodine yields a mixture of isomeric tetraiododibromo-1,3-butadienes. They did not discuss the results that are obtained when dichlorodiacetylene or dibromodiacetylene is chlorinated.

In accordance with this invention, it has been found that when dichlorodiacetylene is chlorinated in the absence of a metal halide, iodine, or other known chlorination catalyst there is obtained a mixture of hexachlorobutadienes that contains about 40 to 60% of 1,1,2,3,4,4-hexachloro-1,3-butadiene and about 40 to 60% of 1,1,3,4,4,4-hexachloro-1,2-butadiene. The hexachloro-1,2-butadiene dimerizes readily to form a substituted cyclobutane.

Of the four possible structures of the dimer, all of which contain a cyclobutane ring and two double bonds, the most likely structure is

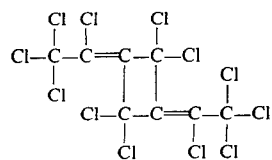

The dimer is a clear viscous liquid. Because of its high chlorine content and its stable structure, it is useful as a hydraulic fluid and as a flame-retardant plasticizer for polyvinyl chloride resins, polyurethane resins, and other resinous materials.

The reactions by which diacetylene is converted to the polychlorinated compounds of this invention are shown in the following equations:

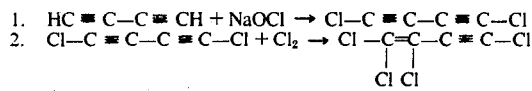
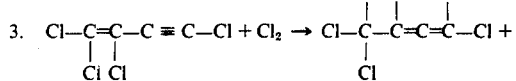
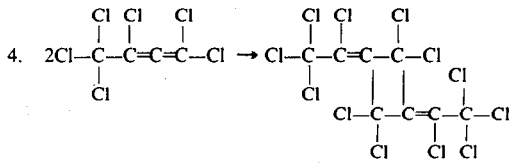

The hexachloro-1,2-butadiene (Compound I) dimerizes quantitatively to form Compound III. Compound I can be further chlorinated in the presence of antimony pentachloride or another chlorination catalyst to octachlorobutene-2.

Compound II (1,1,2,3,4,4-hexachloro-1,3-butadiene) is stable and does not undergo dimerization or further chlorination even in the presence of a chlorination catalyst.

In the process of this invention, a solution of dichlorodiacetylene in an inert organic solvent is contacted with gaseous chlorine in the absence of a chlorination catalyst at a temperature in the range of 0°C. to 80°C. until about 4 gram atoms of chlorine has reacted per mole of dichlorodiacetylene. The solution through which the gaseous chlorine is bubbled is a 0.1 molar to 2.0 molar solution of dichlorodiacetylene in an organic solvent that is substantially inert to chlorination under these reaction conditions, such as chloroform, carbon tetrachloride, hexane, and heptane. Best results have been obtained when a 0.5 molar to 1.5 molar solution of dichlorodiacetylene in carbon tetrachloride was chlorinated at a temperature in the range of 25°C. to 60°C.

When the chlorination step has been completed, the solvent and any unreacted chlorine are removed from the reaction product. The residue contains about 40 to 60% of 1,1,2,3,4,4-hexachloro-1,3-butadiene and 40 to 60% of 1,1,3,4,4,4-hexachloro-1,2-butadiene. This mixture may be separated into its components if desired. It is generally preferred to allow the mixture to stand at a temperature between 20°C. and 100°C. and a pressure between 0.5 atmosphere and 3 atmospheres, and preferably at ambient temperature and atmospheric pressure, until substantially all of the hexachloro-1,2-butadiene has dimerized. The infrared spectrum of the freshly-prepared mixture shows the presence of a considerable amount of allene bonding. After the mixture has aged for several days, its infrared spectrum indicates that more than 65% of the allene bonding has disappeared and that there has been little other change in the composition of the mixture. At the end of the ageing period, the reaction mixture may be distilled to separate the dimer from the hexachloro-1,3-butadiene and reaction by-products. The $C_8Cl_{12}$ dimer prepared in this way is a stable clear red viscous liquid that can be distilled without appreciable decomposition at <0.5 mm Hg and >250°C.

In a preferred embodiment of this invention, the dichlorodiacetylene that is chlorinated to form the novel polychlorinated products is prepared by contacting a gas stream that contains at least 1 mole percent of diacetylene with an aqueous solution of an alkali metal hypochlorite at a temperature in the range of about −10°C. to 20°C. When the reaction between diacetylene and either sodium hypochlorite or potassium hypochlorite is carries out at about 0°C., a quantitative yield of dichlorodiacetylene is obtained. paticularly satisfactory results have been obtained when the starting material was a gas stream that contained 20 mole percent to 40 mole percent of diacetylene, 0 to 30 mole percent of other acetylenic compounds having 3 or 4 carbon atoms, and 30 mole percent to 80 mole percent of inert compounds, such as n-butane, nitrogen, methylene dichloride, and mixtures thereof. When these gas streams are contacted with an aqueous alkali metal hypochlorite solution, the diacetylene is dichlorinated rapidly and quantitatively, and the other acetylenic components of the gas steam are chlorinated only to a minor extent.

The mixtures of acetylenic compounds and inert diluents that are preferably used as the starting material in the process of this invention can be obtained by any suitable and convenient procedure. It is usually most satisfactory to use the mixtures of acetylenic and other compounds that remain after the separation of acetylene from gas streams resulting from the high temperature pyrolysis of hydrocarbons. In addition to providing an inexpensive source of diacetylene, the use of these mixtures provides a way of rendering harmless diacetylene and other unstable acetylenic compounds that are difficult and hazardous to handle and to store.

The gas streams that are obtained by stripping acetylene from a hydrocarbon pyrolysis gas, scrubbing the acetylene with oil, and stripping the oil with nitrogen or another inert gas generally contain about 1 mole percent to 10 mole percent of diacetylene and other $C_3$ and $C_4$ acetylenic compounds. Gas streams that contain higher concentrations of acetylenic compounds having 3 or 4 carbon atoms, that is, 20 percent or more of these compounds, can be obtained by passing a gas stream that contains 10 percent or less of these acetylenic compounds through a bed of activated carbon until the carbon is saturated with $C_3$ and $C_4$ acetylenic compounds and then displacing these compounds by passing an inert gas, which is preferably a mixture of nitrogen, n-butane, and methylene chloride, through the carbon bed. In this way gas streams that contain 20 mole percent to 40 mole percent of diacetylene, 0 to 30 mole percent of vinylacetylene and/or methylacetylene, and 30 mole percent to 80 mole percent of inert compounds are obtained. A procedure for the preparation of a gas stream that contains a sizeable and non-explosive concentration of $C_3$ and $C_4$ acetylenic compounds is described in detail in copending application Ser. No. 91,567, which was filed on Nov. 20, 1970 by David G. Walker and Donald A. Keyworth and which is now U.S. Pat. No. 3,706,181.

Following the reaction of the diacetylene with an alkali metal hypochlorite in an aqueous solution, the dichlorodiacetylene that is formed is separated from the aqueous reaction mixture by extraction with chloroform, carbon tetrachloride, hexane, heptane, or another organic solvent that is substantially inert to chlorination. The resulting solution can be used without purification or other treatment in the chlorination step of the process of this invention.

The invention is further illustrated by the following examples. In these examples, all parts are parts by weight and all percentages are percentages by weight.

EXAMPLE 1

Gaseous chlorine was bubbled for one hour into 300 ml. of a 1.15 molar solution of dichlorodiacetylene in carbon tetrachloride while the reaction mixture was maintained at 25°–60°C. A dry ice reflux condenser was used to return unreacted chlorine to the reactor. A clear transparent cherry-red solution was obtained.

The solution was warmed and a stream of nitrogen was blown across its surface until unreacted chlorine and the carbon tetrachloride had been removed from it and a constant weight of residual oil was obtained. The oil, which weighed 84.7 grams, had a density of 1.63 g./ml. and a chlorine content of 86.0 percent (calculated for hexachlorobutadiene, 81.6% Cl).

The infrared spectrum of the fresh oil had a definite 1975 $cm^{-1}$ bond, which indicated the presence of a compound having the allene structure. After the oil had aged for 2 days at ambient temperature and atmospheric pressure, its infrared spectrum indicated that about 75% of the allene bonds had disappeared and that there had been little other change in its composition.

After 10 days at ambient temperature, the oil was distilled. The following fractions were collected:

| Cut | Distillation Conditions Temperature °C. | Pressure mm/Hg | % By Weight of Oil |
| --- | --- | --- | --- |
| 1 | 40–50 | 3 | 10.7 |
| 2 | 50–72 | 1–3 | 34.5 |
| Residue | 150 | — | 54.8 |

Infrared analysis indicated that Cut 1 contained perchlorovinylacetylene as well as all of the olefinic and paraffinic compounds that were present in the undistilled oil. The infrared spectrum of Cut 2 was identical to that of an authentic sample of hexachloro-1,3-butadiene. The infrared spectrum of the residue showed the following six bonds, which are given in the decreasing order of intensity: 1580 $cm^{-1}$, 780 $cm^{-1}$, 920 $cm^{-1}$, 1430 $cm^{-1}$, 1140 $cm^{-1}$, and 1255 $cm^{-1}$. The residue contained 76.6 percent chlorine and had a molecular weight of 460 (calculated for $C_8Cl_{12}$, 81.6% Cl and molecular weight 522). It was cleanly and almost completely distilled at >250°C./<0.5 mm Hg to give a clear red viscous liquid, which was identified as the dimer of 1,1,3,4,4,4-hexachloro-1,2-butadiene.

EXAMPLE 2

Gaseous chlorine was bubbled for four hours into 50 ml. of a 1.48 molar solution of dichlorodiacetylene in carbon tetrachloride. The chlorination was carried out at ambient temperature and atmospheric pressure. The oil remaining after the removal of the solvent and unreacted chlorine had a density of 1.604 g./ml. and was shown by infrared analysis to be a mixture of hexachloro-1,3-butadiene and hexachloro-1,2-butadiene.

EXAMPLE 3

Gaseous chlorine was bubbled for 3 hours into 500 ml. of a 0.69 molar solution of dichlorodiacetylene in carbon tetrachloride while the reaction mixture was maintained at 40°–80°C. A clear transparent cherry-red solution was obtained. After removal of the solvent and unreacted chlorine, the oil was distilled under vacuum. Analysis of the fractions that were collected indicated that the oil contained

| | |
|---|---|
| $C_4Cl_4$ | 16% |
| $C_4H_6$ | 41% |
| Residue | 43% |

The residue, which was a dark viscous liquid that contained 85.6% chlorine, was a mixture of octachlorobutene-2 and the dimer of hexachloro-1,2-butadiene.

EXAMPLE 4

To 600 ml. of an aqueous solution containing 1.94 moles of sodium hypochlorite which had been cooled to 0°C. was added 100 ml. of a gas mixture that contained 49.2 mole percent of n-butane, 30.6 mole percent of diacetylene, and 20.2 mole percent of vinylacetylene. The reaction mixture was stirred at 0°C. for 3 hours. At the end of this time, it was found that the molar ratio of n-butane to diacetylene in the mixture had increased from about 1.6:1 to 10:1, indicating that at least 85% of the diacetylene had been chlorinated. The aqueous reaction mixture was extracted with 250 ml. of carbon tetrachloride. There was obtained a 1.51 molar solution of dichlorodiacetylene in carbon tetrachloride. When this solution was chlorinated by the procedure described in Example 1, there was obtained a clear red viscous liquid that was shown by infrared analysis to be the dimer of 1,1,3,4,4,4-hexachloro-1,2-butadiene.

EXAMPLE 5

When the procedure described in Example 4 was repeated using potassium hypochlorite in place of sodium hypochlorite, similar results were obtained.

Comparative Example

Gaseous chlorine was bubbled for 1 hour into 144 ml. of a 0.55 molar solution of dichlorodiacetylene in carbontetrachloride that contained 2.4 grams of antimony pentachloride. During the chlorination, the reaction mixture was maintained at ambient temperature and atmospheric pressure. When the catalyst and solvent had been removed from it, there was obtained 19 grams of an oil that had a density of 1.64 g./ml. The oil was distilled at 17 mm Hg pressure, and the following fractions were collected:

| Cut | Boiling Range (°C.) | Wt. % | Composition |
|---|---|---|---|
| 1 | 74–95 | 16.1 | Hexachloro-1,3-butadiene and perchlorovinylacetylene |
| 2 | 100–110 | 29.1 | Hexachloro-1,3-butadiene |
| 3 | 117–180 | 37.4 | Octachlorobutene-2 |
| 4 | Residue | 17.3 | Undistillable Tar |

What is claimed is:

1. 1,1,3,4,4,4-Hexachloro-1,2-butadiene.
2. The process that comprises contacting a solution of dichlorodiacetylene in an inert organic solvent with chlorine in the absence of a chlorination catalyst at a temperature in the range of 0°C. to 80°C. until about 4 gram atoms of chlorine has reacted per mole of dichlorodiacetylene, thereby forming a chlorinated product that comprises 1,1,3,4,4,4-hexachloro-1,2-butadiene.
3. The process of claim 2 wherein the solution that is contacted with chlorine is a 0.1 molar to 2.0 molar solution of dichlorodiacetylene in carbon tetrachloride.
4. The process of claim 2 wherein the solution that is contacted with chlorine is a 0.5 molar to 1.5 molar solution of dichlorodiacetylene in carbon tetrachloride.
5. The process of claim 2 wherein the chlorination is carried out at a temperature in the range of 25°C. to 60°C.
6. The process of claim 2 wherein the chlorinated product is allowed to stand at a temperature in the range of 20°C. to 100°C. and a pressure of 0.5 atmosphere to 3 atmospheres until substantially all of the 1,1,3,4,4,4-hexachloro-1,2-butadiene has dimerized.
7. The process of claim 6 wherein the dimerization is carried out at ambient temperature and atmospheric pressure.
8. The process of claim 6 wherein the product that contains the dimer is distilled to separate the dimer from the other reaction products.
9. The dimer produced by the process of claim 8.
10. The process that comprises the following steps:
   a. Contacting diacetylene with an aqueous solution of an alkali metal hypochlorite at a temperature in the range of −10°C. to 20°C. to form an aqueous reaction mixture containing dichlorodiacetylene;
   b. Extracting dichlorodiacetylene from the aqueous reaction mixture with an organic solvent that is substantially inert to chlorination to form a solution of dichlorodiacetylene in said organic solvent;
   c. Contacting said solution with chlorine in the absence of a chlorination catalyst at a temperature in the range of 0°C. to 80°C. until about 4 gram atoms of chlorine has reacted per mole of dichlorodiacetylene, thereby forming a product mixture that contains about 40 to 60% of 1,1,3,4,4,4-hexachloro-1,2-butadiene.
11. The process of claim 10 wherein in Step (a) diacetylene is contacted with an aqueous solution of sodium hypochlorite at about 0°C.
12. The process of claim 10 wherein the product mixture is allowed to stand at a temperature in the range of 20°C. to 100°C. and a pressure in the range of 0.5 atmosphere to 3 atmospheres until substantially all of the 1,1,3,4,4,4-hexachloro-1,2-butadiene in said mixture has dimerized.
13. The process of claim 12 wherein the dimerization is carried out at ambient temperature and at atmospheric pressure.
14. The process of claim 12 wherein the product mixture that comprises the dimer is distilled and the dimer is recovered.
15. The process of claim 10 wherein the solution that is chlorinated in Step (c) is a 0.1 molar to 2.0 molar solution of dichlorodiacetylene in carbon tetrachloride.
16. The process of claim 10 wherein the solution that is chlorinated in Step (c) is a 0.5 molar to 1.5 molar solution of dichlorodiacetylene in carbon tetrachloride.

17. The process of claim 10 wherein the diacetylene that is chlorinated in Step (a) is a component of a gas stream that contains at least 1 mole percent of diacetylene.

18. The process of claim 10 wherein the diacetylene that is chlorinated in Step (a) is a component of a gas stream that contains 20 to 40 mole percent of diacetylene, 0 to 30 mole percent of other acetylenic compounds having 3 or 4 carbon atoms, and 30 to 80 mole percent of compounds that are substantially inert to chlorination.

19. The process of claim 10 wherein in Step (c) the chlorination is carried out at a temperature in the range of 25°C. to 60°C.

* * * * *

UNITED STATES PATENT OFFICE
CERTIFICATE OF CORRECTION

PATENT NO. : 3,897,505
DATED : July 29, 1975
INVENTOR(S) : David G. Walker and Norman L. Ruland It is certified that error appears in the above-identified patent and that said Letters Patent are hereby corrected as shown below:

Column 2, line 51, change "1,1,3,4,4-" to -- 1,1,3,4,4,4- --.

Column 3, line 11, change "carries" to -- carried --.

Column 3, line 12, change "paticu-" to -- Particu- --.

Signed and Sealed this thirtieth Day of September 1975

[SEAL]

Attest:

RUTH C. MASON
Attesting Officer

C. MARSHALL DANN
Commissioner of Patents and Trademarks